United States Patent [19]

Mizokami

[11] 4,299,459
[45] Nov. 10, 1981

[54] DIAPHRAGM CONTROL CIRCUIT FOR CAMERA

[75] Inventor: Kazunori Mizokami, Hachioji, Japan

[73] Assignee: Olympus Optical Company, Ltd., Shibuya, Japan

[21] Appl. No.: 172,663

[22] Filed: Jul. 28, 1980

[30] Foreign Application Priority Data

Aug. 22, 1979 [JP] Japan .......................... 54/115392[U]

[51] Int. Cl.³ ............................................ G03B 7/097
[52] U.S. Cl. .................................. 354/23 D; 354/38; 354/44
[58] Field of Search ................. 354/23 D, 36, 37, 38, 354/43, 44

[56] References Cited

U.S. PATENT DOCUMENTS 3,882,522  5/1975  Erlichman ..................... 354/23 D
3,997,905 12/1976  Iwata et al. .................... 354/23 D

FOREIGN PATENT DOCUMENTS 44-29191 12/1969 Japan .

Primary Examiner—Russell E. Adams
Attorney, Agent, or Firm—Weinstein & Sutton

[57] ABSTRACT

A diaphragm control circuit for a camera responds to a shutter release operation by causing a reverse rotation of a stepping motor to return a diaphragm mechanism to its initial position. Subsequently, the circuitr causes a forward rotation of the motor in accordance with the amount of light received by the camera in order to cause the diaphragm mechanism to establish a proper diaphragm aperture before an opening operation of a shutter is allowed.

7 Claims, 11 Drawing Figures

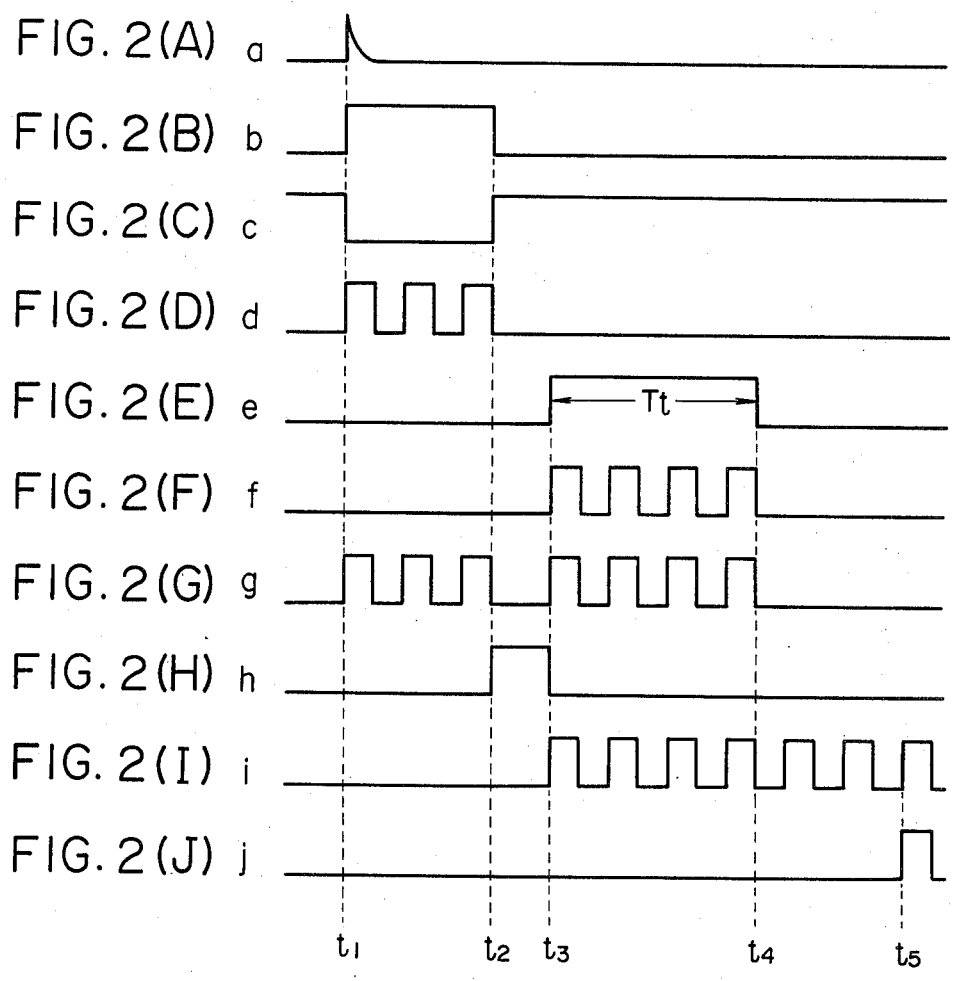

DIAPHRAGM CONTROL CIRCUIT FOR CAMERA

BACKGROUND OF THE INVENTION

The invention relates to a diaphragm control circuit for a camera, and more particularly, to a diaphragm control circuit for a camera including a diaphragm mechanism which is operated through a control of a stepping motor.

Recently, a diaphragm control circuit utilizing a stepping motor is used in cameras of an automatic exposure control type. The stepping motor is interconnected with a diaphragm mechanism so that an angular increment through which the stepping motor rotates is determined in accordance with the amount of reflected light from an object being photographed to thereby control a diaphragm aperture. To assure the accuracy of the angular increment, the rotary shaft of the stepping motor is reversely rotated to its initial position after it has been used to drive the diaphragm mechanism. For example, the stepping motor is returned to its initial position in response to the closure of a shutter, or in response to the operation of a member associated with a film winding mechanism. However, in the prior art construction of the diaphragm control circuit, a design is made such that the stepping motor is left deenergized except when taking a picture in order to achieve a saving in the power dissipation. However, this might cause a displacement of the motor shaft from its initial position in response to extraneous oscillations applied thereto until the next time a picture is taken. Hence, the displacement must be prevented by the provision of a special mechanical constraining member, resulting in a complex arrangement and interfering with the recent trend toward achieving a reduced size of the camera.

SUMMARY OF THE INVENTION

It is an object of the invention to eliminate the above disadvantage of the prior art by providing a diaphragm control circuit for a camera in which a stepping motor which is interlocked with a diaphragm mechanism for controlling a diaphragm aperture is driven in response to a shutter release operation to reset the diaphragm mechanism to its initial position and thereafter it is driven in the reverse direction to establish a diaphragm aperture before the opening operation of a shutter is allowed.

In accordance with the invention, the stepping motor is always returned to its start position before the shutter is allowed to open. Hence, if the motor shaft is displaced from its initial or start position as a result of extraneous oscillations applied thereto during the time when the motor is left deenergized, an accurate diaphragm aperture can be established before taking a picture.

BRIEF DESCRIPTION OF THE DRAWINGS

FIGS. 2(A)-(J) are a series of timing charts illustrating the waveform of various signals appearing at different points in the circuit shown in FIG. 1.

DESCRIPTION OF PREFERRED EMBODIMENT

Figure 1:
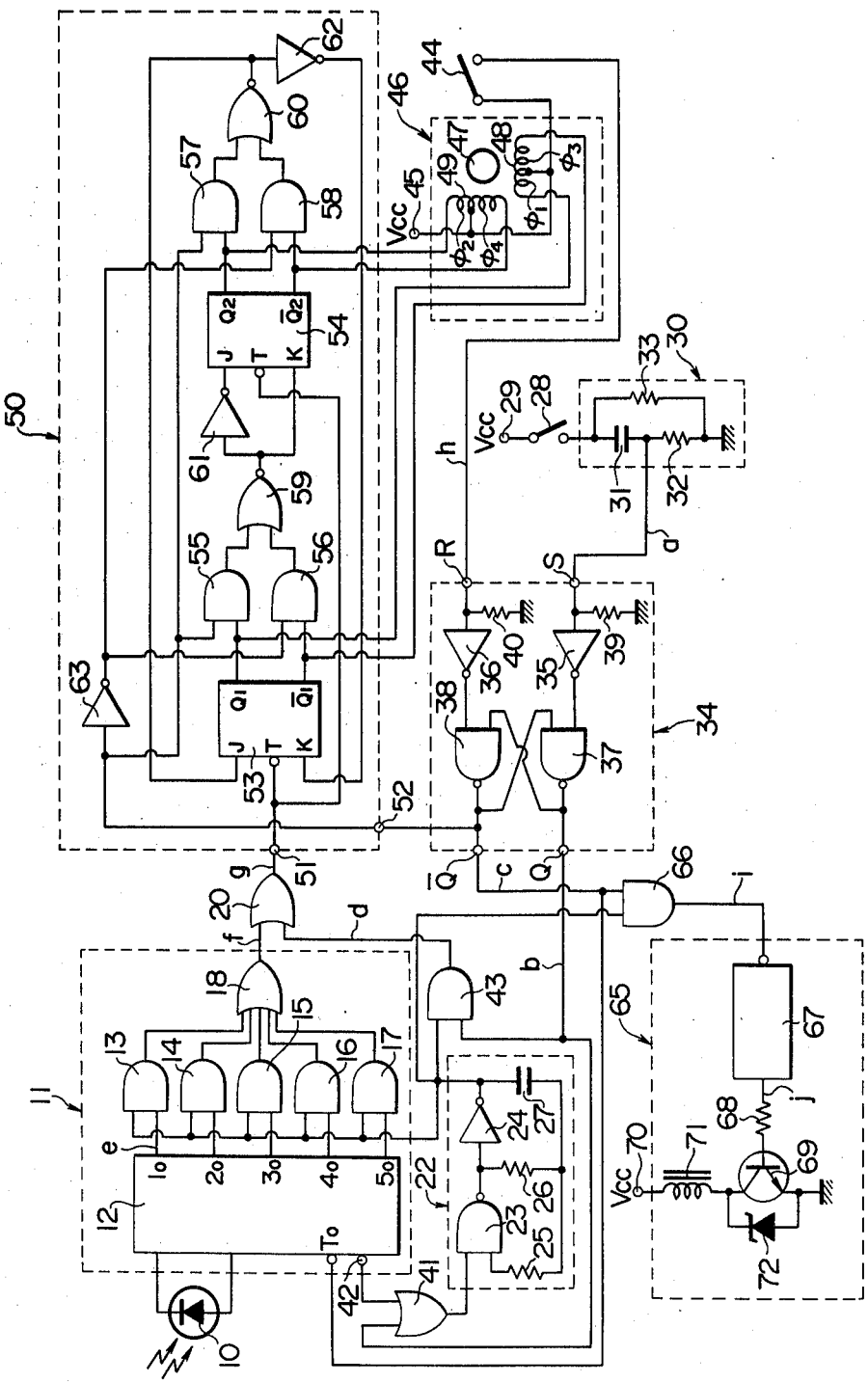
FIG. 1 is a circuit diagram of a diaphragm control circuit for camera according to one embodiment of the invention.

Referring to FIG. 1, there is shown a photoelectric transducer element 10 such as a silicon photodiode which produces a photocurrent in response to the amount of light received which is reflected from an object being photographed. The transducer element 10 is disposed within a finder optical system of a camera, and is connected to an input of a calculation circuit 12 which is included in a diaphragm presetting circuit 11. The purpose of the calculation circuit 12 is to determine a proper diaphragm value in accordance with the magnitude of the photocurrent, and includes a plurality of output terminals $1_O$ to $5_O$, from one of which a diaphragm value signal having a pulse width which corresponds to the magnitude of the photocurrent is developed at a given time interval after a trigger terminal $T_O$ of the circuit assumes a high level. The output terminals $1_O$–$5_O$ are connected to one input of AND gates 13 to 17, respectively, which have their output terminal connected to one input of a five input OR gate 18, the output of which is fed to one input terminal of another OR gate 20. The other input of AND gates 13–17 is fed in common from the output of a clock pulse generator 22 including NAND gate 23 having its one input connected to the input terminal of the generator 22 and having its output connected to the input of an inverter 24, the output of which feeds the other input of AND gates 13–17. A series combination of resistors 25, 26 is connected across the other input and the output of NAND gate 23, and a capacitor 27 is connected between the junction across these resistors and the output terminal of the generator. It should be understood that the construction of such a clock pulse generator is well known in the art.

A release switch 28 which is adapted to be closed in response to the depression of a release button has one of its contacts connected to a terminal 29, to which a supply voltage Vcc is applied, while the other contact of the switch 28 is connected to a differentiator 30 formed by a series combination of a capacitor 31 and resistor 32 shunted by a resistor 33. It will be noted that one terminal of the capacitor 31 is connected to the switch while the remote terminal of the resistor 32 and of the resistor 33 is connected to the ground, and the differentiator 30 forms a release circuit which produces a release signal. The junction between the capacitor 31 and the resistor 32 is connected to a set terminal S of R-S flip-flop 34 which also includes a reset terminal R. The flip-flop 34 is formed by a pair of inverters 35, 36 having their inputs connected to the set and the reset terminal S, R, respectively, and a pair of NAND gates 37, 38, one input of which is directly fed from the associated inverter and having their other input connected to the output of the other NAND gate, which is connected to output terminals Q, $\overline{Q}$, respectively, of the flip-flop 34. A pair of resistors 39, 40 are connected across the input of the respective inverters 35, 36 and the ground. The output terminal Q of the flip-flop 34 is connected to one input of OR gate 41, the other input of which is connected to an output terminal 42 of the calculation circuit 12 which assumes a high level at a given time interval after the trigger terminal $T_O$ has assumed a high level. The output of OR gate 41 is connected to the input terminal of the clock pulse generator 22, namely, to the one input terminal of NAND gate 23. As shown, the output of the inverter 24 is also connected to one input of AND gate 43, the other input of which is connected to the output terminal Q of the flip-flop 34. The output of AND gate 43 is connected to the other input of OR gate 20, which has its output connected to a pulse input terminal 51 of a motor energization distributor 50.

The reset terminal R of the flip-flop 34 is connected through an initial position detecting switch 44 to a feed terminal 45, to which a supply voltage Vcc is applied. The purpose of the initial position detecting switch 44 is to detect the fact that a rotary shaft 47 of a stepping motor 46 has returned to its initial position, by its closure. The output terminal $\overline{Q}$ of the flip-flop 34 is connected to a direction command terminal 52 of the motor energization distributor 50 for directing the direction in which the motor should be rotated. The distributor 50 functions to supply output pulses from the clock pulse generator 22 which are derived through OR gate 20 to exciting coils 48, 49 of the four phase stepping motor 46, each time energizing two phases thereof in a sequential manner. Specifically, the distributor comprises a J-K flip-flop of master-slave type (hereafter simply referred to as J-K flip-flops) 53, 54, AND gates 55–58, NOR gates 59, 60 and inverters 61–63. More specifically, the pulse input terminal 51 is connected to a trigger input terminal T of the J-K flip-flops 53, 54. The $Q_1$, $\overline{Q}_1$ output terminals of the J-K flip-flop 53 are connected to one input of AND gates 55, 56 respectively, while the $Q_2$, $\overline{Q}_2$ output terminals of the J-K flip-flop 54 are connected to one input of AND gates 57, 58, respectively. The other input of AND gates 55, 57 are directly fed from the direction command terminal 52 while the other input of AND gates 56, 58 are connected to the direction command terminal 52 through an inverter 63. The output of AND gates 55, 56 are both connected to two input terminals of NOR gate 59 while the outputs of AND gates 57, 58 are fed to two inputs of NOR gate 60. The output of NOR gate 59 is connected through the inverter 61 to J input of the J-K flip-flop 54 and is also directly connected to K input of the J-K flip-flop 54. The output of NOR gate 60 is directly connected to the J input of the J-K flip-flop 53 and also connected through the inverter 62 to the K input of the J-K flip-flop 53. The output terminal $Q_1$ of the J-K flip-flop 53 is connected to one end, or a first phase $\phi_1$, of the exciting coil 48 of the stepping motor 46 which includes a tap connected to the voltage terminal 45 while the output terminal $\overline{Q}_1$ is connected to the other end, or a third phase $\phi_3$, of the exciting coil 48. The output terminal $Q_2$ of the flip-flop 54 is connected to one end, or a second phase $\phi_2$, of the exciting coil 49 of the stepping motor 46 which includes a tap connected to the voltage terminal 45 while the output terminal $\overline{Q}_2$ is connected to the other end, or a fourth phase $\phi_4$, of the exciting coil 49.

The output terminal $\overline{Q}$ of the flip-flop 34 and the trigger terminal $T_O$ of the calculation circuit 12 are both connected to one input of AND gate 66, the other input of which is connected to the output of the clock pulse generator 22 or the inverter 24. The output of AND gate 66 is connected to the input terminal of a counter/decoder circuit 67 which forms part of a shutter drive circuit 65. The output of the counter/decoder circuit 67 is connected through a resistor 68 to the base of an NPN switching transistor 69 which has its collector connected to one end of a release electromagnet 71, which has its other end connected to a voltage terminal 70 to which the supply voltage Vcc is applied. The emitter of the transistor 69 is connected to the ground. A Zener diode 72 is connected across the collector and emitter of the transistor 69.

Having described the arrangement of the diaphragm control circuit, its operation will be described with reference to timing charts shown in FIG. 2. FIGS. 2(A)-(J) represent the waveform of signals appearing at various points shown in the circuit of FIG. 1 which are designated by corresponding alphabetical characters a-j. Assume that the film has been wound up and the shutter has been charged. In response to the depression of a shutter release button in order to take a picture, the rotary shaft 47 of the stepping motor 46 which controls the diaphragm aperture is returned to its initial position. Specifically, as the release button is depressed, the release switch 28 is closed, causing the differentiator 30 to produce a differentiated or release signal a at time $t_1$, which is applied as a high level signal (hereafter abbreviated as "H" signal) to the set terminal S of the flip-flop 34. This sets the flip-flop 34, which therefore develops a "H" signal b at its output terminal Q while the output c developed at the output terminal $\overline{Q}$ assumes a low level (hereafter abbreciated as "L" signal. The signal b is fed through OR gate 41 to the clock pulse generator 22, whereupon the latter produces a clock pulse, which is in turn applied to one input of AND gate 43. Since the other input of AND gate 43 receives the output b from the flip-flop 34, the clock pulse is developed as the output d from AND gate 43 during the time the signal b assumes "H" level. The signal c developed at the output terminal $\overline{Q}$ of the flip-flop 34 and which is applied to the trigger terminal $T_O$ of the calculation circuit 12 assumes "L" level, so that the calculation circuit 12 cannot be triggered. Hence all of its output terminals $1_O$–$5_O$ assume "L" level, not producing any diaphragm value signal. Accordingly, a signal f developed at the output of NOR gate 18 also assumes "L" level. Accordingly, the clock pulse which is developed as the output d from AND gate 43 is directly passed through OR gate 20 as the signal g, which is applied to the pulse input terminal 51 of the distributor 50. Since the signal c developed at the output terminal Q of the flip-flop 34 assumes "L" level, the direction command terminal 52 thereof assumes "L" level. When the "L" signal c from the flip-flop 34 is applied to the terminal 52 and thence to AND gates 55, 57 as the direction command signal and its inverted signal is applied to AND gates 56, 58, an inversion of the output from the output terminal $\overline{Q}_1$ of the flip-flop 53 or the output of the output terminal $Q_1$ thereof is developed at the output of NOR gate 59 while an inversion of the output from the output terminal $\overline{Q}_2$ of the flip-flop 54 or the output from the output terminal $Q_2$ thereof is developed at the output of NOR gate 60. The output from the output terminal $Q_1$ which is produced at the output of NOR gate 59 is applied to the J input terminal of the flip-flop 54 after inversion and is also applied directly to the K input terminal. On the other hand, the output from the output terminal $Q_2$ which is produced at the output of NOR gate 60 is directly applied to the J input terminal of the flip-flop 53 and is also applied to the K input terminal thereof after inversion. Consequently, when the clock pulse g from OR gate 20 is applied to the trigger input terminal T of the flip-flops 53, 54 from the pulse input terminal 51, there occurs for each clock pulse applied a cyclical change in the condition of the outputs $Q_1$, $\overline{Q}_1$, $Q_2$, $\overline{Q}_2$ of the flip-flops 53, 54 starting with $Q_1=Q_2=$"L," $\overline{Q}_1=\overline{Q}_2=$"H," for example, through $Q_1=\overline{Q}_2=$"L," $\overline{Q}_1=Q_2=$"H"→$\overline{Q}_1=Q_2=$"L," $Q_1=\overline{Q}_2=$"H"→$Q_1=Q_2=$"L," $\overline{Q}_1=\overline{Q}_2=$"H" and so on. As a consequence, the "L" pulse from the distributor is fed to the respective phases $\phi_1$–$\phi_4$ of the exciting coils 48, 49 of the stepping motor 46 in pair, cyclically in the sequence of $\phi_2$, $\phi_1$→$\phi_1$, $\phi_4$→$\phi_4$, $\phi_3$→$\phi_3$, $\phi_2$→$\phi_2$, $\phi_1$ and so on. This causes the rotary shaft 47 of the motor 46 to stepwise rotate in the counter-clockwise direction through a given angular increment. Since the signal c from the output terminal $\overline{Q}$ of the flip-flop 34 which is applied to one input of AND gate 66 assumes "L" level, AND gate 66 is disabled, and hence the release electromagnet 71 remains deenergized.

In this manner, the rotary shaft 47 of the motor 46 rotates stepwise in the counter-clockwise direction to return to its initial position, whereupon optical means may be used to detect the return to close the switch 44, thus applying "H" input h to the reset terminal R of the flip-flop 34. When the flip-flop 34 is reset in this manner, the signal b developed at its output terminal Q assumes "L" level while the signal c developed at its output terminal $\overline{Q}$ assumes "H" level. When the signal b assumes "L" level, OR gate 41 produces "L" output, temporarily disabling the clock pulse generator 22. As the signal c from the flip-flop 34 assumes "H" level, "H" signal is applied to the trigger terminal $T_O$ of the calculation circuit 12 to trigger it. After a given time interval which is required to permit the stepping motor 46 to be stabilized at its rest position or at time $t_3$, one of the output terminals $1_O$–$5_O$ produces a diaphragm value signal e having a pulse width Tt which depends on the amount of light received by the transducer element $T_O$, and is fed to one of AND gates 13–17. Simultaneously, the output terminal 42 supplies "H" signal to the clock pulse generator 22 through OR gate 41. Hence, the generator 22 produces a clock pulse, which enables said one of AND gates 13–17 to permit OR gate 18 to pass a clock pulse output f. Since output terminal Q of the flip-flop 34 now produces "L" signal b, AND gate 43 is disabled, so that OR gate 20 directly passes the signal f from OR gate 18 as the signal g, which is applied to the pulse input terminal 51 of the distributor 50. At this time, the signal c developed at the output terminal $\overline{Q}$ of the flip-flop 34 assumes "H" level, the "H" signal is applied to the direction command terminal 52 of the distributor 50. When the "H" signal c from the flip-flop 34 is applied to the terminal 52 and thence to AND gates 55, 57 with its inverted signal applied to AND gates 56, 58, an inversion of the signal developed at the output terminal $Q_1$ of the flip-flop 53 or the signal developed at the output terminal $\overline{Q}_1$ thereof is produced at the output of NOR gate 59 while an inversion of the signal developed at the output terminal $Q_2$ of the flip-flop 54 or the signal developed at the output terminal $\overline{Q}_2$ thereof is produced at the output of NOR gate 60. Hence the signal from the output terminal $Q_1$ is applied to the J-input terminal after inversion and is directly applied to the K input terminal of the flip-flop 54. The signal from the output terminal $\overline{Q}_2$ is directly applied to the J input terminal and is applied to the K input terminal of the flip-flop 53 after inversion. Accordingly, when the clock pulse g from OR gate 20 is applied to the trigger input terminal T of flip-flops 53, 54 from the pulse input terminal 51, there occurs for each clock pulse applied, a cyclical change in the condition of the outputs $Q_1$, $\overline{Q}_1$, $Q_2$, $\overline{Q}_2$ of the flip-flops 53, 54, starting from a condition that $Q_1=Q_2=$"L," $\overline{Q}_1=\overline{Q}_2=$"H," for example, and cycling through $\overline{Q}_1=Q_2=$"L," $Q_1=\overline{Q}_2=$"H"→$\overline{Q}_1=\overline{Q}_2=$"L,"
$Q_1=Q_2=$"H"→$\overline{Q}_1=Q_2=$"L,"
$\overline{Q}_1=Q_2=$"H"→$Q_1=Q_2=$"L," $\overline{Q}_1=\overline{Q}_2=$"H" and so on. As a consequence, the "L" pulse from the distributor is supplied to the individual phases $\phi_1$–$\phi_4$ of the exciting coils 48, 49 of the motor 46 in pair, in a cyclical sequence of $\phi_1$, $\phi_2 \rightarrow \phi_2$, $\phi_3 \rightarrow \phi_3$, $\phi_4 \rightarrow \phi_4$, $\phi_1 \rightarrow \phi_1$, $\phi_2$ and so on. This causes the rotary shaft 47 of the motor 46 to rotate stepwise in the clockwise direction through a given angular increment. The stepwise rotation of the motor 46 in the clockwise direction is continued until time $t_4$ when a number of pulses g have been supplied which corresponds to the pulse width Tt of the output e from the calculation circuit 12 which in turn depends on the amount of light received. In this manner, a diaphragm mechanism which is connected with the stepping motor 46 may be driven to establish a diaphragm aperture which is appropriate for the amount of light received from an object being photographed.

It will be seen that when the signal c from the output terminal $\overline{Q}$ of the flip-flop 34 enables AND gate 66, the output i thereof is fed as an output clock pulse from the clock pulse generator 22. The counter/decoder circuit 67 produces a trigger signal j at time $t_5$ when the counter/decoder circuit 67 has counted a given number of clock pulses i which is slightly greater than the number of increments of the motor which is required for the stepping motor to operate the diaphragm mechanism from its maximum to its minimum diaphragm aperture. The trigger signal j renders the transistor 69 conductive, demagnetizing the electromagnet 71 to enable a closing operation of the shutter.

As described, with the diaphragm control circuit of the invention, the stepping motor is rotated reversely to return the diaphragm mechanism to its initial condition in response to a shutter release operation and before the shutter is allowed to open. Subsequently, the motor is rotated forwardly in accordance with the amount of light received to drive the diaphragm mechanism in order to establish a proper diaphragm aperture, whereupon the shutter opening operation is allowed. Hence, a proper diaphragm aperture can be established without any adverse influence such as a change in the initial position of the motor which may be caused by extraneous oscillations. Thus, the motor may be left deenergized except when it is desired to take a picture without requiring any special constraining member to maintain it at its initial position.

It should be understood that the invention is not limited to the particular embodiment described above, but that a variety of changes and modifications can be made therein including the arrangement of the motor energization distributor.

What is claimed is:

1. A diaphragm control circuit for a camera, comprising
   a stepping motor interlocked with a diaphragm mechanism of a camera to allow the latter to establish a diaphragm aperture in accordance with an angle of rotation thereof,
   a clock pulse generator for producing a drive pulse which enables said motor to be rotated either in a forward or reverse direction,
   a motor energization distributor for distributing said drive pulse to a plurality of exciting coils of said motor,
   a release circuit responsive to a shutter release operation for producing a release signal which causes said motor to rotate in reverse to return said motor to its initial position,
   a direction of rotation command circuit for controlling the direction in which said motor is rotated by applying a direction command signal to a direction command terminal of said distributor, said command circuit being responsive to said release signal to cause said motor to rotate in reverse, a reset means responsive to said release signal for applying a reset signal to said command circuit by detecting that said motor has been rotated in reverse stepwise to its initial position, said command circuit causing said motor to rotate in a forward direction in response to said reset signal, a diaphragm presetting circuit responsive to said reset signal for allowing said drive pulse to be fed to a pulse input terminal of said distributor for a time duration which corresponds to the amount of light reflected by an object being photographed, and a shutter drive circuit for causing a shutter to be released after a desired diaphragm aperture has been set as a result of a forward rotation of said stepping motor in response to the application of said drive pulse thereto through said distributor for said duration.

2. A diaphragm control circuit according to claim 1 in which said direction of rotation command circuit comprises an R-S flip-flop.

3. A diaphragm control circuit according to claim 1 in which said diaphragm presetting circuit comprises a calculation circuit pulse which produces an output having a width which depends on the amount of light reflected from an object being photographed, and an AND circuit responsive to the output from said calculation circuit and an output from said clock pulse generator.

4. A diaphragm control circuit according to claim 1 wherein said stepping motor is of the four-phase type.

5. A diaphragm control circuit according to claim 1 wherein said motor energization distributor includes a pair of flip-flop circuits.

6. A diaphragm control circuit according to claim 1 wherein said reset means includes an initial position detecting switch.

7. A diaphragm control circuit for a camera comprising:

a stepping motor interconnected with a diaphragm mechanism of a camera for setting the diaphragm aperture in accordance with the position of said stepping motor;

means for producing a drive pulse for enabling said stepping motor to be rotated either in a forward or reverse direction;

means for distributing said drive pulse to said motor;

means response to a shutter release operation for producing a release signal for causing said stepping motor to rotate in a reverse direction to return it to its initial position.

means for controlling the direction in which said stepping motor is rotated by applying a direction command sigal to said distributing means, said controlling means being responsive to said release signal to cause said stepping motor to rotate in a reverse direction;

means responsive to said release signal for applying a reset signal to said controlling means by detecting that said stepping motor has been moved to its initial position, said controlling means causing said stepping motor to rotate in a forward direction in response to said reset signal;

a diaphragm presetting circuit responsive to said reset signal for allowing said drive pulse to be supplied to said distributing means for a time period corresponding to the amount of light reflected by an object being photographed; and a shutter drive circuit for causing a shutter to be released after a desired diaphragm aperture has been set as a result of movement of said stepping motor in a forward direction in response to the application of said drive pulse thereto through said distributing means.

* * * * *

UNITED STATES PATENT AND TRADEMARK OFFICE
CERTIFICATE OF CORRECTION

PATENT NO. : 4,299,459
DATED : November 10, 1981
INVENTOR(S) : Kazunori Mizokami It is certified that error appears in the above—identified patent and that said Letters Patent is hereby corrected as shown below:

In the abstract, line 4, change "circuitr" to --circuit--.

Column 4, line 63, should read: $--\bar{Q}_1 = Q_2 = "H" \rightarrow$ $\bar{Q}_1 = \bar{Q}_2 = "L", Q_1 = Q_2 = "H" \rightarrow \bar{Q}_1 = Q_2 = "L", --$ Column 4, line 64, should read: $--Q_1 = \bar{Q}_2 = "H" \rightarrow$ $Q_1 = Q_2 = "L", \bar{Q}_1 = \bar{Q}_2 = "H"$ and so--.

Claim 7, column 8, line 11, change "response" to --responsive--.

Claim 7, column 8, line 17, change "sigal" to --signal--.

Signed and Sealed this

Seventh Day of September 1982

[SEAL]

Attest:

GERALD J. MOSSINGHOFF

*Attesting Officer*   *Commissioner of Patents and Trademarks*